H. S. DILLS.
PROCESS OF FISH BAIT MANUFACTURE.
APPLICATION FILED JAN. 25, 1918.
1,391,670.
Patented Sept. 27, 1921.
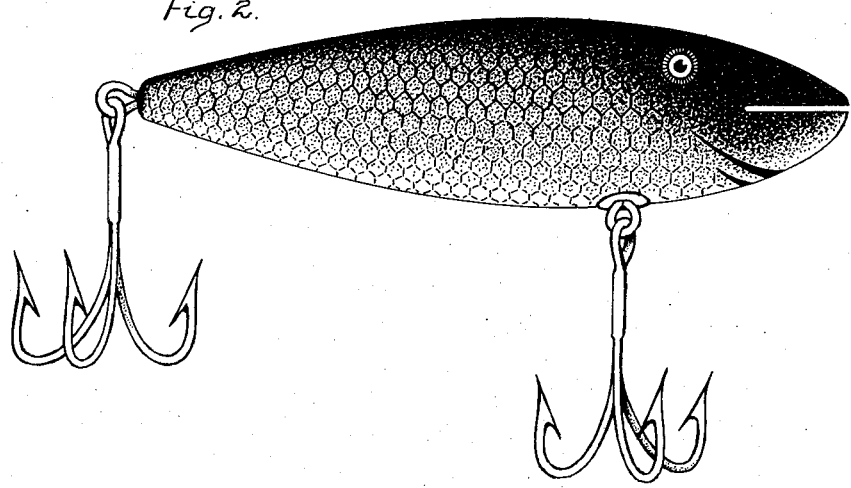
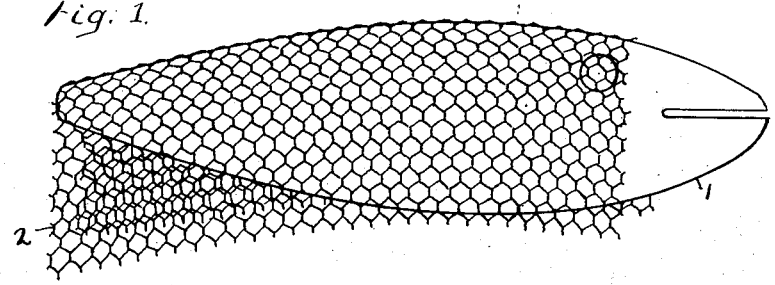
INVENTOR.
Henry S. Dills
BY
Taylor & Hulse
ATTORNEYS.

UNITED STATES PATENT OFFICE.

HENRY S. DILLS, OF GARRETT, INDIANA, ASSIGNOR OF ONE-HALF TO JAMES HEDDON'S SONS, INCORPORATED, OF DOWAGIAC, MICHIGAN, A CORPORATION OF MICHIGAN.

PROCESS OF FISH-BAIT MANUFACTURE.

1,391,670.　　　　　　　Specification of Letters Patent.　　Patented Sept. 27, 1921.

Application filed January 25, 1918. Serial No. 213,628.

*To all whom it may concern:*

Be it known that I, HENRY S. DILLS, a citizen of the United States, residing at Garrett, in the county of Dekalb and State of Indiana, have invented new and useful Improvements in Processes of Fish-Bait Manufacture.

The invention relates to processes of manufacturing fish baits. The most desirable and effective bait is that which closely imitates the appearance of the natural minnow. Numerous attempts have been made heretofore to produce a bait having a finish in imitation of the scales of a fish, but none of them have been successful so far as I am aware.

The object of the invention is to provide an attractive bait having a finish closely resembling a minnow and to accomplish the same in a novel manner.

In carrying out the invention I first apply to the usual bait body one or more coats of coloring matter of the desired color or colors to form a background. I then wrap about the body a flexible stencil having its cut-out portions closely imitating in outline the scales of a fish, and then apply a coat of coloring matter to the surface of the stencil either by rubbing or by an air brush. The best results are obtained by using coloring matter in powdered form of the desired color and applying it with an air brush. A cheap and advantageous stencil is cloth screening or mosquito netting since it readily conforms to the shape of the bait body. The coloring matter passes through the meshes of the screen and adheres to the surface of the bait between the strands of the screen. Then the screen is removed and further coloring matter is applied at selected points if desired and the body is then lacquered or otherwise finished off with a transparent coat.

In the drawing Figure 1 illustrates a bait body 1 having the desired color or combination of colors of background with the stencil 2 wrapped around it preparatory to applying desired coloring material to form the scales and Fig. 2 is a view of the bait after the scales have been applied, the view illustrating the hooks attached.

Any size and color of scale desired may be produced in the foregoing manner and after they are produced additional coats of coloring matter may be applied at desirable points on the body to correspond to the natural coloring of the fish which the bait is designed to imitate.

What I claim is:

1. The method of representing fish scales on a fish bait body which comprises wrapping flexible thread about the fish bait body in such manner that the thread will form the outlines for the individual scales, then applying a distinctive coat of selected coloring matter to the body over the thread, and then removing the thread.

2. The method of representing fish scales on a fish bait body, comprising applying a background of desired coloring matter to said body, then wrapping flexible thread closely about the body in such manner that the individual scales are outlined by the thread, then applying a distinctive coat of selected coloring material to the body over the thread, and then removing the thread.

3. The method of representing fish scales on a fish bait body which comprises wrapping closely about a fish bait body a flexible netting the threads of which correspond to the outlines of the scales to be represented, then applying a distinctive coat of selected coloring matter to the body over the netting and then removing the netting.

4. The method of representing fish scales on a fish bait body comprising applying a background of desired coloring matter to said body, then wrapping closely about the body a flexible netting the threads of which correspond to the outlines of the scales to be represented, then applying a distinctive coat of selected coloring material to the body over the thread, and then removing the netting.

5. The method of representing fish scales on an artificial fish bait body comprising applying a background of desired coloring matter, then wrapping closely about the body a flexible netting the threads of which correspond to the outlines of the scales to be represented, then applying a coat of selected coloring matter to the body over the netting, then removing the netting, and finally covering the said body with a transparent coating.

6. The method of representing fish scales on a body which comprises applying flexible thread closely to the body in such manner that the thread will form the outline for the individual scales, then applying a distinctive coat of selected coloring material to the body over the thread, and then removing the thread.

7. The method of representing fish scales on a fish bait body which comprises applying a coating of the color of that part of the fish bait body which is shown between the scales, then wrapping a flexible thread network closely about the body, in such manner that the individual scales are outlined by the thread, then applying a coating of the color of the scales of the fish over the thread and over the first coating, and then removing the thread network to expose the underneath coating as a network of uniformly defined lines.

In witness whereof I hereunto subscribe my name this 19th day of January, 1918.

HENRY S. DILLS.